United States Patent
Ohki et al.

(10) Patent No.: US 6,723,932 B2
(45) Date of Patent: Apr. 20, 2004

(54) WATER IMMERSED ELECTRICAL SWITCH AND METHOD FOR PREPARATION THEREOF

(75) Inventors: Hiroshi Ohki, Kanagawa (JP); Haruo Watanabe, Kanagawa (JP); Yasuhito Inagaki, Kanagawa (JP); Tsutomu Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 47 days.

(21) Appl. No.: 10/239,705

(22) PCT Filed: Jan. 18, 2002

(86) PCT No.: PCT/JP02/00356
§ 371 (c)(1),
(2), (4) Date: Dec. 30, 2002

(87) PCT Pub. No.: WO02/058090
PCT Pub. Date: Jul. 25, 2002

(65) Prior Publication Data
US 2003/0146076 A1 Aug. 7, 2003

(30) Foreign Application Priority Data
Jan. 22, 2001 (JP) .......................................... 2001-13771

(51) Int. Cl.$^7$ .............................................. G08B 21/00
(52) U.S. Cl. ................................... 200/61.04; 340/605
(58) Field of Search ............................... 73/40, 40.5 R; 128/886; 200/61.04–61.07; 340/603–605, 620

(56) References Cited

U.S. PATENT DOCUMENTS

| | | | | | |
|---|---|---|---|---|---|
| 2,937,524 | A | * | 5/1960 | Gregor | ..................... 73/335.05 |
| 4,642,601 | A | * | 2/1987 | Sugawara et al. | ............. 338/35 |
| 5,173,684 | A | * | 12/1992 | Ijiri et al. | .................... 340/605 |
| 5,378,995 | A | * | 1/1995 | Kudo et al. | .................. 324/693 |
| 5,790,036 | A | * | 8/1998 | Fisher et al. | ................. 340/605 |

FOREIGN PATENT DOCUMENTS

| | | | | |
|---|---|---|---|---|
| JP | 60163020 | 6/1994 | ............ | H01M/2/16 |
| JP | 60-229904 | 11/1995 | ............ | C08F/8/44 |
| JP | 10180123 | 7/1998 | ............ | B01J/39/20 |
| JP | 10-004151 | 9/1998 | ............ | B01J/20/26 |
| JP | 10-249193 | 9/1998 | ............ | B01J/20/20 |
| JP | 10-249194 | 9/1998 | ............ | B01J/20/26 |
| JP | 10-180123 | 7/2002 | ............ | B01J/39/20 |

* cited by examiner

*Primary Examiner*—Michael Friedhofer
(74) *Attorney, Agent, or Firm*—Sonnenschein, Nath & Rosenthal LLP

(57) ABSTRACT

A water-immersed switch which does not conduct electricity in the absence of a dielectric liquid, such as water, and which conducts electricity in the presence of the dielectric liquid. The water-immersed switch includes a modified copolymer containing acrylonitrile and at least one of styrene and/or a conjugated diene, as constituent units, and acidic groups introduced into said modified copolymer, and a plurality of electrically conductive electrodes.

46 Claims, No Drawings

WATER IMMERSED ELECTRICAL SWITCH AND METHOD FOR PREPARATION THEREOF

TECHNICAL FIELD

This invention relates to a water-immersed switch which uses a polymer material containing acrylonitrile and at least one of styrene and/or a conjugated diene, as constituent units, or a waste material thereof, and which, subject to inflow of an inductive fluid, allows for electrical conduction across plural electrodes and for maintaining the state of the electrical conduction for a prolonged time. This invention also relates to a method for the preparation of the water-immersed switch.

The water-immersed electrical switch, which may also be called a water-flushed electrical switch, is such a switch which does not conduct the electricity in the absence of a dielectric liquid, such as water, and which conducts the electricity in the presence of the dielectric liquid.

In the present specification, the copolymer material containing (a) acrylonitrile and (b) at least one of styrene and/or a conjugated diene, as constituent units, is sometimes abbreviated to a 'copolymer'. A modified copolymer comprised of the copolymer into which have been introduced acidic groups is sometimes abbreviated to 'a modified copolymer'.

BACKGROUND OF THE INVENTION

Among the resins containing acrylonitrile and styrene or a conjugated diene as constituent units, there are polystyrene based resins, exemplified by an ABS (acrylonitrile-butadiene-styrene) resin, a SAN (styrene-acrylonitrile) resin or an AAS (acrylonitrile-acrylate-butadiene) resins, and synthetic rubber, such as NBR (acrylonitrile-butadiene) rubber. These resins are relatively inexpensive and, in particular, the polystyrene based resins are superior in toughness, dimensional stability or workability, and hence are used in abundant quantities as a resin material for covers or casings for variegated use, and for chassis or variegated component materials for electrical equipment or automobiles. The synthetic rubber is also used in abundant quantities as tubing, hoses or as variegated shock-absorbing materials.

Recently, the production volume of the products employing the abovementioned resin materials is increasing. In keeping pace therewith, the amount of waste materials derived from these materials tends to be increased, such that, in conjunction with the general interest in maintenance of the global environment, there is an increasing need for effective utilization of the waste materials derived from the above-mentioned resin materials.

Under such situation, the above-mentioned resin materials are expected to be re-used in an enlarged range of application, such that there is raised a demand for modification of the resin materials to higher added value products.

Meanwhile, the polymer-based waste materials are disposed of roughly by three types of techniques, namely land-filling, incineration and re-melting. Of these, land-filling and incineration account for approximately 90% of the total amount of disposal of the waste material, meaning that most of the waste material is not re-used.

As the method of recycling the polymer waste material, such a method of melting by heating and re-molding is routinely used, insofar as the thermoplastic resin is concerned. In this case, a lot of problems are presented, such as thermal deterioration, for example the lowering of the molecular weight or resin oxidation, admixture of foreign matter, such as dust and dirt, or admixture of resins containing various colorants which leads to the necessity of color matching. That is, in recycling polymer waste materials by heating or melting, processing techniques or costs pose serious impediments.

SUMMARY OF THE INVENTION

It is an object of the present invention to provide an electrical switch in which a polymer material containing acrylonitrile on one hand and styrene and/or a conjugated diene on the other hand or its waste material may be used effectively as a material of a higher added value, and a method for producing the electrical switch.

The present inventors have conducted eager searches towards accomplishing the above object, and have completed a water-immersed electrical switch comprised of the modified product and plural electrically conductive electrodes, which electrodes are electrically connected to each other on inflow of a dielectric liquid. The modified product is made up by a polymer material, preferably a used resin, containing a preset amount of acrylonitrile on one hand and at least one of styrene and/or a conjugated diene on the other band, as constituent units, and by acidic groups introduced into the modified product.

Specifically, the water-immersed electrical switch according to the present invention uses a polymer material, preferably a used resin, containing a preset amount of acrylonitrile and styrene or a conjugated diene, and modifies it to form a modified copolymer or a hydrophilic gel by introducing acidic groups at least into the styrene or conjugated diene part of the polymer material. The hydrophilic gel is then dehydrated, if so desired, and is combined with plural electrically conductive electrodes. In the water-immersed electrical switch according to the present invention, when a dielectric liquid flows to or around the hydrophilic gel, the latter is swollen to become an ion-conductive electrolyte to produce electrical conductivity across the electrically conductive electrodes. This electrical conductivity may be maintained for an extended period of time.

The method for producing the water-immersed electrical switch according to the present invention combines a modified copolymer, comprised of a polymer material, preferably a used resin, containing, as constituent units, a preset amount of acrylonitrile on one hand and at least one of styrene and/or a conjugated diene on the other hand, and acidic groups, introduced thereto, with plural electrically conductive electrodes. Specifically, the method of the present invention includes acid-processing a polymer material, or a used resin, comprised of a polymer material, preferably a used resin, containing, as constituent units, a preset amount of acrylonitrile on one hand and at least one of styrene and/or a conjugated diene on the other hand, to produce a modified product, dehydrating the resulting product, if so desired, and combining the modified product with a plurality of electrically conductive electrodes to produce a water-immersed electrical switch, in which, when the dielectric liquid flows to the switch, electrical conductivity is produced across the electrically conductive electrodes.

According to the present invention, the copolymer preferably contains 5 to 80 mol % of acrylonitrile units. The copolymer also preferably contains 20 to 95 mol % of the constituent unit of at least one of styrene and/or a conjugated diene.

The copolymer is at least one selected from the group consisting of ABS (acrylonitrile-butadiene-styrene) resin, SAN (styrene-acrylonitrile) resin and NBR (acrylonitrile-butadiene) rubber.

The copolymer further contains an inorganic pigment.

The inorganic pigment is carbon black and/or titanium oxide.

The inorganic pigment is preferably contained in an amount of 0.01 to 5 wt % based on the weight of the copolymer (dry weight).

The acidic group in the modified copolymer is at least one selected from the group consisting of a sulfo group, —PO(OH)$_2$ and —CH$_2$PO(OH)$_2$.

The acidic group in the modified copolymer is a sulfo group.

The acidic group in the modified copolymer is preferably contained in an amount of 5 to 95 mol % based on the total weight of the units in the modified copolymer.

The water-immersed electrical switch according to the present invention includes a modified copolymer, and a plurality of electrically conductive electrodes. The modified copolymer is a used resin into which acidic groups are introduced. The used resin is a modified copolymer containing acrylonitrile and at least one of styrene and/or a conjugated diene, as constituent units, and acidic groups introduced into the modified copolymer, with the used resin having been molded for use in specified application.

The copolymer contains 5 to 80 mol % of acrylonitrile units.

The copolymer contains 20 to 95 mol % of the constituent unit of at least one of styrene and/or a conjugated diene.

The copolymer is at least one selected from the group consisting of ABS (acrylonitrile-butadiene-styrene) resin, SAN (styrene-acrylonitrile) resin and NBR (acrylonitrile-butadiene) rubber.

The copolymer further contains an inorganic pigment.

The inorganic pigment is carbon black and/or titanium oxide.

The inorganic pigment is contained in an amount of 0.01 to 5 wt % based on the weight of the copolymer (dry weight).

The acidic group in the modified copolymer is at least one selected from the group consisting of a sulfo group, —PO(OH)$_2$ and —CH$_2$PO(OH)$_2$.

The acidic group in the modified copolymer is a sulfo group.

The acidic group in the modified copolymer is contained in an amount of 5 to 95 mol % based on the total weight of the units in the modified copolymer.

The method for producing a water-immersed switch according to the present invention includes combining a modified copolymer containing acrylonitrile and at least one of styrene and/or a conjugated diene, as constituent units, and acidic groups introduced into the modified copolymer, and a plurality of electrically conductive electrodes.

The copolymer preferably contains 5 to 80 mol % of acrylonitrile units.

The copolymer contains 20 to 95 mol % of the constituent unit of at least one of styrene and/or a conjugated diene.

The copolymer is at least one selected from the group consisting of ABS (acrylonitrile-butadiene-styrene) resin, SAN (styrene-acrylonitrile) resin and NBR (acrylonitrile-butadiene) rubber.

The copolymer further contains an inorganic pigment.

The inorganic pigment is carbon black and/or titanium oxide.

The inorganic pigment is contained in an amount of 0.01 to 5 wt % based on the weight of the copolymer (dry weight).

The acidic group in the modified copolymer is introduced into the copolymer using at least one inorganic acid selected from the group consisting of concentrated sulfuric acid, sulfuric anhydride, fuming sulfuric acid, chlorosulfonic acid, phosphoric acid, phosphorus chloride and phosphorus oxide.

The acidic group in the modified copolymer is introduced into the copolymer using concentrated sulfuric acid with the concentration not lower than 70 wt %.

The acidic group in the modified copolymer is introduced into the copolymer by sequentially adding concentrated sulfuric acid and/or chlorosulfonic acid and sulfuric anhydride and/or fuming sulfuric acid.

The copolymer is crushed small-sized pieces 3.5 mesh or less in size.

The method for producing a water-immersed electrical switch according to the present invention includes combining a modified copolymer and a plurality of electrically conductive electrodes. The modified copolymer is a used resin into which acidic groups are introduced. The used resin is a modified copolymer containing acrylonitrile and at least one of styrene and/or a conjugated diene, as constituent units, and acidic groups introduced into the modified copolymer, with the used resin having been molded for use in specified application.

The copolymer preferably contains 5 to 80 mol % of acrylonitrile units.

The copolymer contains 20 to 95 mol % of the constituent unit of at least one of styrene and/or a conjugated diene.

The copolymer is at least one selected from the group consisting of ABS (acrylonitrile-butadiene-styrene) resin, SAN (styrene-acrylonitrile) resin and NBR (acrylonitrile-butadiene) rubber.

The copolymer further contains an inorganic pigment.

The inorganic pigment is carbon black and/or titanium oxide.

The inorganic pigment is contained in an amount of 0.01 to 5 wt % based on the weight of the copolymer (dry weight).

The acidic group in the modified copolymer is introduced into the copolymer using at least one inorganic acid selected from the group consisting of concentrated sulfuric acid, sulfuric anhydride, fuming sulfuric acid, chlorosulfonic acid, phosphoric acid, phosphorus chloride and phosphorus oxide.

The acidic group in the modified copolymer is introduced into the copolymer using concentrated sulfuric acid with the concentration not lower than 70 wt %.

The acidic group in the modified copolymer is introduced into the copolymer by sequentially adding concentrated sulfuric acid and/or chlorosulfonic acid and sulfuric anhydride and/or fuming sulfuric acid.

The copolymer is crushed small-size pieces 3–5 mesh or less in size. Other objects, features and advantages of the present invention will become more apparent from reading the embodiments of the present invention.

DETAILED DESCRIPTION OF THE PREFERRED EMBODIMENTS

The 'water-immersed switch' in the present invention is desirably such a one which initially exhibits electrical turnoff properties, and in which, on inflow of the dielectric liquid to the switch, electrical conductivity is displayed across electrically conductive electrodes to display the electrically conductive state as the electrical switch. The water-immersed switch according to the present invention may preferably be such a one in which the electrically conductive stale is terminated in a short time but may more preferably be such a one in which the electrically conductive state may be kept for protracted time. This electrical switch is useful for detecting liquid leakage, water line or rainfall. It may also be used for detecting whether or not liquid leakage, change in water line or rainfall occurred in the past, that is for detecting the hysteresis of liquid leakage, water line or rainfall.

Meanwhile, there is no particular limitation to the dielectric liquid, provided that the liquid exhibits inductivity. Specifically, such liquid may encompass not only the liquid electrolyte but also tap water, distilled water, alcohols, such as methanol or ethanol, or mixtures thereof. Most preferred is the liquid composed mainly of water. Although the number of electrically conductive electrodes is preferably two, it may for example be any number exceeding two, such as three of four.

As the copolymer used in the present invention, such a copolymer containing about 5 to 80 mol %, preferably about 10 to 60 mol % and more preferably 20 to 50 mol % of acrylonitrile units, is desirable.

The content of the acrylonitrile units in the copolymer is about 5 mol % or more, preferably about 10 mol % or more and more preferably about 20 mol % or more, in order that the modified copolymer obtained does not substantially exhibit water solubility and can be handled easily. In addition, the content of the acrylonitrile units in the copolymer is about 80 mol % or less, preferably about 60 mol % and more preferably about 20 to 50 mol %.

The content in the copolymer of acrylonitrile unit is about 5 mol % or more, preferably about 10 mol % or more and more preferably about 20 mol % or more, in order that, when the copolymer is processed with an acid, the resulting modified copolymer will be handled readily without becoming substantially soluble in water. In addition, the content of acrylonitrile units in the copolymer is about 80 mol % or less, preferably about 60 mol % or less and more preferably about 50 mol % or less, in order to evade the copolymer becoming hardened, in order to facilitate crushing the copolymer into small-sized pieces in the production process of the water-immersed switch, in order to evade the content in the copolymer of styrene and/or conjugated diene units or the rate of introduction of acidic groups being decreased and in order for the modified copolymer to manifest the effect as the electrolyte effectively.

It is desirable for the comonomer used in the present invention to contain at least one of styrene and/or a conjugated diene, such as butadiene or isoprene, as a constituent unit other than acrylonitrile, in an amount of about 20 to 95 mol %, preferably about 40 to 85 mol % and more preferably about 50 to 80 mol %.

The content in the comonomer of the above constituent unit is about 95 mol % or less, preferably about 85 mol % or less and more preferably about 80 mol % or less, in order that, in processing the copolymer with an acid, the resulting modified copolymer can be handled readily without becoming substantially water-soluble. In addition, the content of the above constituent unit in the copolymer is about 20 μmol % or more, preferably about 40 mol % or more and more preferably about 50 mol % or more, in order to evade the copolymer becoming hardened, in order to facilitate crushing the copolymer into small-sized pieces in the production process of the water-immersed switch, in order to evade the rate of introduction of acidic groups being decreased and in order for the modified copolymer to manifest the effect as the electrolyte effectively.

It is possible for other constituent units to be contained in the copolymer used in the present invention, provided that preset amounts of acrylonitrile and styrene and/or a conjugated diene are contained in the copolymer.

These other constituent units may, for example, maleic anhydride, itaconic anhydride, α-methylstyrene, acrylamide, methacrylamide, acrylic acid, acrylates, methacrylic acid, methacrylate, vinyl acetate, vinyl chloride, ethylene, propylene, butylene, vinyl pyrrolidone or vinylpyridine, only by way of examples. Meanwhile, the acrylates and methacrylates are desirably those having 1 to 10 carbon atoms and may be saturated or unsaturated.

The weight average molecularweight (Mw) of the copolymerused in the present invention is routinely about 1,000 to 20,000,000 and preferably about 10,000 to 1,000,000.

The weight average molecular weight (Mw) is preferably about 1,000 or more and more preferably about 10,000 or more, in order that the resulting modified copolymer will be the desired gelated electrolyte without being substantially water-soluble. Moreover, for achieving an efficient reaction of acid processing for introducing acidic groups to the copolymer, for shortening the reaction time and for increasing the density of acidic groups introduced, the weight average molecular weight (Mw) is preferably about 20,000,000 or less, more preferably about 1,000,000 or less.

As the copolymer used in the present invention, it is desirable to use polymer materials, such as, for example, ABS (acrylonitrile-butadiene-styrene) resin, SAN (styrene-acrylonitrile) resin, ASA (acrylonitrile-styrene-acrylamide) resin, ACS (acrylonitrile-chlorinated polystyrene-styrene) resin, AAS (acrylonitrile-acrylatestyrene) resin, or NBR (acrylonitrile-butadiene) rubber. These resin materials may be newly prepared unused resin particles (virgin pellets). Alternatively, these resin materials may also be used resins or waste resins, molded for specified usage or application. The waste materials may be ejects (odds and ends) of the resin feedstock or molded products from the production process chassis already used in electrical equipment or automobiles, various component materials, tubes, hoses or various shock-absorbing materials. The used resins mean those resins recovered from the above waste materials. The waste materials in the present invention may be those from plants, selling stores or household. The waste materials recovered from plants or selling stores, such as rejects or odds and ends, are preferred to the waste materials recovered from the household, because the former waste materials are generally more uniform in composition.

The copolymer used in the present invention may be the above polymer material alloyed with other resins, or may be used or waste resins containing additives as known per se, such as face dyes, stabilizers, combustion retardants, plasticizers, fillers and other assistant agents. Alternatively, the copolymer may also be a mixture of the used or waste material with unused materials (virgin materials).

The other resins that can be mixed with the above-mentioned polymer materials in the above alloyed product may be those resins that are known per se. However, these other resins are preferably those that do not obstruct acid processing of the present invention. These resins may specifically be exemplified by, for example polyphenylene ether, polycarbonates, polyphenylene sulfide, polyethylene terephtbalate, polybutyleneterephthalate, polyamide or polyester. The mixing amount of these resins is preferably about 60 wt % or less based on the weight of the polymer material. This range is preferred in order to raise the density of the acidic groups in forming acidic groups in acidic processing and in order for the modified copolymer to manifest the properties as the electrolyte effectively.

The copolymer used in the present invention is preferably in the form of small sized pieces for convenience in acidic processing used for introducing acidic groups. Among the methods for processing the copolymer into small-sized pieces, there are following methods, which are given only by way of examples. That is, there is such a method consisting in finely dividing the copolymer by a crusher or pulverizer and in subsequently sieving the finely divided copolymer. In particular, if the copolymer contains rubber components, it is desirable to effect crushing following freezing. There is also such a method consisting in melting the copolymer under heating and in subsequently pelletizing (forming into particles) the resulting product to micro-sized beads.

The size of the small-sized pieces of the copolymer is preferably about 3.5 mesh or less. This size range is desirable for increasing the surface area of the reaction product, assisting in the acid processing reaction, shortening the reaction time, increasing the density of the acidic groups and for effectively demonstrating the performance of the modified copolymer as the electrolyte.

If further an inorganic substance is contained in the copolymer of the present invention, acidic processing for introducing the acidic groups is accelerated, that is, an inorganic pigment and its neighboring portion are more prone to acid processing, more specifically, the inorganic pigment is more prone to be disengaged from the copolymer during the reaction from the copolymer, with the acid being more prone to be permeated into the surface area of the copolymer. Consequently, an inorganic material is preferably contained in the copolymer of the present invention.

This inorganic material is preferably carbon black and/or titanium oxide, which may be those routinely used as colorants, reinforcing agents or electrifying agents for plastics. Specifically, the carbon black may be one prepared by any one of a channeling method, a furnace method or a thermal method, which may be used singly or in combination. Meanwhile, the mean particle size is usually about 5 to 500 $\mu$m and preferably about 10 to 50 $\mu$m. As for titanium oxide, it may be of the rutile type, anatase type, or ultra-small-sized particulate titanium. These different types of titanium oxide may be used singly or in combination. Meanwhile, the mean particle size is usually about 0.01 to 50 $\mu$m and preferably about 0.05 to 10 $\mu$m.

The content of the carbon black or titanium oxide contained in the copolymer is on the order of about 0.01 to 5 wt % and preferably on the order of about 0.05 to 3 wt % based on the dry weight of the copolymer.

The water-immersed electrical switch of the present invention has, as its constituent element, the modified copolymer comprised of the above-described copolymer into which acidic groups have been introduced.

The method of introducing acidic groups into the copolymer may includes the method of acid processing the copolymer. By acid processing, the copolymer is converted into a hygroscopic gel electrolyte. Specifically, an analysis of the modified copolymer, produced by the acid processing, indicates that pat of acrylonitrile in the copolymer is turned into amide, while acidic groups are introduced into styrene and a conjugated diene.

As the acid used in the acidic processing of the present invention, an inorganic acid, capable of introducing acidic groups into styrene or into conjugated diene is desirable. The inorganic acid may be enumerated by, for example, concentrated sulfuric acid, sulfuric anhydride, fuming sulfuric acid, sulfonating agents, such as chlorosulfonic acid, nitric acid, fuming nitric acid, phosphoric acid, phosphorus chloride or phosphorus oxide. Of these, concentrated sulfuric acid, sulfuric anhydride, fuming sulfuric acid and chlorosulfonic acid are preferred and, in particular, concentrated sulfuric acid with the concentration of approximately 70 wt % is more preferred.

These inorganic materials may be used either singly or in combination. If used in combination, the acids may be mixed together or added sequentially. For example, by initially processing the copolymer with concentrated sulfuric acid and subsequently adding sulfuric anhydride, a gel electrolyte exhibiting shape stability may be obtained with the aqueous system. It is because the processing with concentrated sulfuric acid mainly hydrolyzes the nitrile fraction in the copolymer and subsequent processing with sulfuric anhydride necessarily cross-links the styrene or conjugated diene fraction with sulfone to give a gel with a high cross-linking degree. Consequently, the above-mentioned acid processing represents one of desirable embodiments of the acid processing in the present invention.

The amount of inorganic acids used in the reaction (charge) is on the order of approximately 1 to 500 and preferably approximately 10 to 200 times the weight of the copolymer.

For increasing the rate of introduction of acidic groups to the styrene or conjugated diene or the rate of hydrolytic reaction of the acrylonitrile groups for thereby promoting generation of the acidic groups and affording hydrophilicity to the copolymer, the amount of charge of the inorganic acid is preferably on the order of approximately one and more preferably on the order of approximately len times the weight of the copolymer. In the perspective of economic advantage and workability, the charge of the inorganic acid is not higher than about 500 times and preferably not higher than about 200 times the weight of the copolymer.

Although the acid processing of the present invention may be carried out in an inorganic acid, it may also be carried out in a system employing an organic acid.

The organic acid usable in the acid processing may be enumerated by, for example, aliphatic halogenated hydrocarbons, with 1 to 2 carbon atoms (preferably 1,2-dichloroethane, chloroform, dichloromethane or 1,1-dichloroethane), aliphatic cyclic hydrocarbons (preferably cyclohexane, methylcyclohexane or cyclopentane), nitromethane, nitrobenzene, sulfur dioxide, paraffinic hydrocarbons (preferably with 1 to 7 carbon atoms), acetonitrile, carbon disulfide, tetrahydrofuran, tetrahydropyran, 1,2-dimethoxyethane, acetone, methylethylketone and thiophene. Of these, aliphatic halogenated hydrocarbons, with 1 to 2 carbon atoms, aliphatic cyclic hydrocarbons, nitromethane, nitrobenzene and sulfur dioxide are preferred. These may be used singly or in combination. In a mixed solvent, there is no limitation to the mixing ratio.

These organic solvents are preferably used in amounts less than about 200 times the weight of the copolymer. This range is preferred for raising the reactivity of acid processing and in view of economic advantages.

If desired, Louis bases may also be used in the acid processing. Examples of the Louis bases include alkyl phosphates, dioxane, acetic anhydride, ethyl acetate, ethyl palmitate, diethylether and thioxane. As the alkyl phosphates, triethyl phosphate or trimethyl phosphate, for example, may be used.

It is noted that the inorganic acid or organic solvent, once used for the above acid processing, may be recovered after the reaction and directly used, or may be recovered by sampling or distillation and re-used for the reaction.

According to the present invention, acid processing of the copolymer introduces acidic groups to the styrene and/or the conjugated diene, while acrylonitrile is turned into an amide by a hydrolytic reaction and modified to a hydrophilic resin to yield a hydrophilic gel electrolyte.

The acidic group introduced into the unit of styrene or the conjugated diene may be exemplified by sulfo group [—$SO_3H$], —$PO(OH)_2$ and —$CH_2PO(OH)_2$. Of these acidic groups, the sulfo group is preferred. Only one of the acidic groups or plural acidic groups may be introduced into the copolymer. For satisfying the properties of the hydrophilic gel electrolyte, used in the water-immersed electrical switch of the present invention, the amount of acidic groups contained in the modified copolymer is to be about 5 to 95 mol % and preferably 10 to 70 mol % based on the total weight of the respective units. In order for the modified copolymer not to manifest water-solubility substantially and in order to provide a gel exhibiting shape stability, the amount of acidic groups contained in the modified copolymer is to be about 95 mol % or less and preferably about 70 mol % or less based on the total weight of the respective units. In order to increase the rate of introduction of the acidic groups, in order to afford hydrophilicity and ionic characteristics to the modified copolymer and in order for the modified copolymer to operate effectively as the hydrophilic gel electrolyte, the amount of acidic groups contained in the modified copolymer is to be about 5 mol % or more and preferably about 10 mol % or more based on the total weight of the respective units.

If the acidic groups in the modified copolymer are sulfo groups, the copolymer may be reacted in situ or in a solvent with the aforementioned sulfonating agents, as known per se, for example, concentrated sulfuric acid, sulfuric anhydride, fuming sulfuric acid or chlorosulfuric acid to introduce sulfo groups to the copolymer. If the acidic groups in the modified copolymer is —$PO(OH)_2$ groups, the acidic group may be introduced into the copolymer by addition of phosphorus trioxide to the solvent followed by hydrolysis.

For introducing the preset amount of the acidic group to the copolymer, the aforementioned acid processing reaction in the present invention is preferably carried out under the following conditions:

The reaction temperature is generally on the order of 0 to 200° C. and preferably on the order of 30 to 120° C., although it differs appreciably depending on whether or not an organic solvent is used. For raising the reaction speed to some extent from the practical viewpoint, and for achieving a modified copolymer as the hygroscopic resin exhibiting optimum performance, the reaction temperature is preferably about 0° C. or higher and more preferably about 30° C. or higher. In order to evade such a situation in which molecular chains of the copolymer are broken on pyrolysis and in which the modified copolymer becomes soluble in water, the reaction temperature is preferably about 200° C. or lower and preferably about 120° C. or lower.

The acid processing reaction time is generally 1 minute to 40 hours and preferably about five minutes to two hours, although it may vary significantly with the reaction temperature. This range is preferred in order for the reaction to proceed sufficiently and in order to raise the production efficiency.

If desired, organic or inorganic salts or hydroxides may further be added to the modified copolymer according to the present invention. These organic or inorganic salts or hydroxides may be enumerated by, for example ammonium, and compounds, exemplified by hydroxides, carbonates, acetates, sulfates, phosphates or salts of organic acids of alkali metals, such as sodium, lithium or potassium, alkali earth metals, such as magnesium or calcium, and other metals, such as aluminum, titanium, germanium, tin, iron, zinc, copper, indium, gallium, silicon, zirconium, nickel, cobalt, vanadium, silver, manganese or bismuth. Examples of the organic acids include citric acid, lactic acid, amino acid, e.g., glutamic acid or aspartic acid, alginic acid, malic acid and gluconic acid.

It is possible for the modified copolymer to contain metallic or non-metallic ions. Although these ions may form a salt with the acidic groups of the modified copolymer, it is also possible to add isolated salts having isolated acidic groups different than the acidic groups.

The modified copolymer, obtained as described above, is in the form of a gel. The modified copolymer is then preferably dehydrated or dried by exposure to sunbeam, heating, pressure reduction, centrifugation or press-working.

The water-immersed switch of the present invention is produced from the modified copolymer, which is the hygroscopic gel electrolyte obtained on acid processing and optionally by dehydration, and from plural electrically conductive electrodes. Among preferred embodiments, there is a water-immersed electrical switch comprising the modified copolymer, dehydrated if desired, and a pair of electrically conductive electrodes arranged on both sides of the modified copolymer.

The electrically conductive electrode, used in the present invention, may be formed of a material as known per se. For example, the electrically conductive electrode may be formed of metals, alloys, carbon, electrically conductive metal oxides, metal compounds, such as metal hydrate oxides or metal halogenides, mixtures thereof, composite materials thereof with organic or inorganic polymer materials, or electrically conductive polymer materials.

As the dielectric liquid flows around the water-immersed electrical switch of the present invention, the modified copolymer of the present invention is swollen and the electrically conductive electrodes are electrically connected to each other by the electrical conductivity, specifically, by ionic conductivity, to demonstrate the electrically conductive state of the electrical switch of the present invention. It is one of the features of the water-immersed electrical switch of the present invention that this electrically conductive stale may be maintained for protracted time.

Moreover, in the water-immersed electrical switch of the present invention, the electrically turned-off state is not deteriorated until the modified copolymer becomes swollen with inflow of the dielectric liquid, such that the state of ionic conduction is established across the electrodes. It is thus another feature of the present invention that there scarcely occurs deterioration in the preserved state As the water-immersed electrical switch of the present invention, samples of the water-immersed electrical switch of Examples 1 and 2 were prepared and evaluated. This present invention is, of course, not limited to these Examples.

Example 1

1 part by weight of a waster material of SAN (styrene-acrylonitrile) resin was added to 30 parts by weight of sulfuric acid (96 wt %) and reaction was continued at 80° C. for 20 minutes. As the waste material of the SAN resin, the resin used in a transparent portion of a 8 mm cassette tape guard panel, containing 60 mol % of styrene, 40 mol % of acrylonitrile, crushed by a shredder to 16 to 32 mesh size, was used.

After the end of the reaction, the solid content in the system was filtered through a glass filter and washed with water. The filtered product was dried in a circulating drier at 105° C. for two hours. From the results of elementary analysis of sulfur, it was found that sulfo groups in the solid content account for 36% based on the total weight of the monomer units.

The dried product 0.5 g, molded to a filament, was charged into a cell of synthetic resin, with the inner dimension of 20×50×10 mm, and a pair of gold-plated copper electrode plates, 20×60 mm in size, were securely mounted facing each other in the cell. The inside of the cell was then charged with water. The dried product was swollen with water. The swollen gelated product occupied the space lying between the electrodes such that an electrically conductive state was established across the electrodes. This electrically conductive state was kept after ten days such that no substantial decrease in the electrical resistance was noticed.

Example 2

3.5 parts by weight of a waste ABS (acrylonitrile-butadiene-styrene) resin were charged into 90 parts by weight of concentrated sulfuric acid (96 wt %) to permit the reaction to occur at 60° C. for 60 minutes. Then, 0.5 part by weight of fuming sulfuric acid, containing 60 wt % of $SO_3$, was added further and the reaction was allowed to occur for further 30 minutes. As the waste material of the ABS resin, the resin used in a white-tinted portion of casing of a personal computer, containing 48 mol % of styrene, 39 mol % of acrylonitrile, 13 mol % of butadiene and 1 wt % of titanium oxide, crushed by a freezer shredder to 16 to 32 mesh size, was used.

After end of the reaction, the solid content in the system was washed with water and filtered. The filtered product was dried for two hours in a drier. This processing yielded a white-tinted solid product. The sulfo groups in the solid product accounted for 42 mol % based on the total weight of the monomer units.

As in Example 1, the dried product 0.5 g, molded to a filament, was charged into a cell of synthetic resin, with the inner dimension of 20×50×10 mm, and a pair of gold-plated copper electrode plates, 20×60 mm in size, were securely mounted facing each other in the cell. The inside of the cell was then charged with water. The dried product was swollen with water. The swollen gelated product occupied the space lying-between the electrodes such that an electrically conductive state was established across the electrodes. This electrically conductive state was kept after ten days such that no substantial decrease in the electrical resistance was noticed.

Industrial Applicability

Since the hygroscopic gel electrolyte of the water-immersed switch of the present invention can be manufactured even from the used resin, the present invention contributes to efficacious utilization of resources and hence to maintenance of global environment.

The water-immersed switch of the present invention, manufactured even from the waste material, may be in the electrically conductive state for prolonged time and is superior in preservation performance, so that it is useful in detection of water leakage, water line or rainfall. The present invention renders it possible to exploit the waste polymer material to produce such a high added-value material thus promoting recycling of the waste material which is being produced in ever increasing quantities.

What is claimed is:

1. A water-immersed electrical switch comprising:
    a modified copolymer containing acrylonitrile and at least one of styrene or a conjugated diene, as constituent units, and acidic groups introduced into said modified copolymer; and
    a plurality of electrically conductive electrodes.

2. The water-immersed electrical switch according to claim 1 wherein said copolymer contains 5 to 80 mol % of acrylonitrile units.

3. The water-immersed electrical switch according to claim 1 wherein said copolymer contains 20 to 95 mol % of the constituent unit of at least one of the styrene and/or a conjugated diene.

4. The water-immersed electrical switch according to claim 1 wherein said copolymer is at least one selected from the group consisting of ABS (acrylonitrile-butadiene-styrene) resin, SAN (styrene-acrylonitrile) resin and NBR (acrylonitrile-butadiene) rubber.

5. The water-immersed electrical switch according to claim 1 wherein said copolymer further contains an inorganic pigment.

6. The water-immersed electrical switch according to claim 5 wherein said inorganic pigment is carbon black or titanium oxide.

7. The water-immersed electrical switch according to claim 5 wherein said inorganic pigment is contained in an amount of 0.01 to 5 wt % based on the weight of the copolymer (dry weight).

8. The water-immersed electrical switch according to claim 1 wherein the acidic group in said modified copolymer is at least one selected from the group consisting of a sulfo group, —$PO(OH)_2$ and —$CH_2PO(OH)_2$.

9. The water-immersed electrical switch according to claim 1 wherein the acidic group in the modified copolymer is a sulfo group.

10. The water-immersed electrical switch according to claim 1 wherein the acidic group in the modified copolymer is contained in an amount of 5 to 95 mol % based on the total weight of the units in the modified copolymer.

11. The water-immersed electrical switch according to claim 1 wherein the copolymer is crushed.

12. The water-immersed electrical switch according to claim 11 wherein the copolymer is crushed, acid-processed and subsequently dried.

13. A water-immersed electrical switch comprising:
    a modified copolymer; and
    a plurality of electrically conductive electrodes;
    said modified copolymer being a used resin into which acidic groups are introduced;
    said used resin being a modified copolymer containing acrylonitrile and at least one of styrene or a conjugated diene, as constituent units, and acidic groups introduced into said modified copolymer, said used resin having been molded for use in specified application.

14. The water-immersed electrical switch according to claim 13 wherein said copolymer contains 5 to 80 mol % of acrylonitrile units.

15. The water-immersed electrical switch according to claim 13 wherein said copolymer contains 20 to 95 mol % of the constituent unit of at least one of the styrene or a conjugated diene.

16. The water-immersed electrical switch according to claim 15 wherein said copolymer further contains an inorganic pigment.

17. The water-immersed electrical switch according to claim 16 wherein said inorganic pigment is carbon black or titanium oxide.

18. The water-immersed electrical switch according to claim 16 wherein said inorganic pigment is contained in an amount of 0.01 to 5 wt % based on the weight of the copolymer (dry weight).

19. The water-immersed electrical switch according to claim 13 wherein said copolymer is at least one selected from the group consisting of ABS (acrylonitrile-butadiene-styrene) resin, SAN (styrene-acrylonitrile) resin and NBR (acrylonitrile-butadiene) rubber.

20. The water-immersed electrical switch according to claim 13 wherein the acidic group in said modified copolymer is at least one selected from the group consisting of a sulfo group, —$PO(OH)_2$ and —$CH_2PO(OH)_2$.

21. The water-immersed electrical switch according to claim 13 wherein the acidic group in the modified copolymer is a sulfo group.

22. The water-immersed electrical switch according to claim 13 wherein the acidic group in the modified copolymer is contained in an amount of 5 to 95 mol % based on the total weight of the units in the modified copolymer.

23. The water-immersed electrical switch according to claim 13 wherein the copolymer is crushed.

24. The water-immersed electrical switch according to claim 23 wherein the copolymer is crushed, acid-processed and subsequently dried.

25. A method for producing a water-immersed switch comprising combining a modified copolymer containing acrylonitrile and at least one of styrene or a conjugated diene, as constituent units, and acidic groups introduced into said modified copolymer; and a plurality of electrically conductive electrodes.

26. The method for producing a water-immersed electrical switch according to claim 25 wherein said copolymer contains 5 to 80 mol % of acrylonitrile units.

27. The method for producing a water-immersed electrical switch according to claim 25 wherein said copolymer contains 20 to 95 mol % of the constituent unit of at least one of the styrene and/or a conjugated diene.

28. The method for producing a water-immersed electrical switch according to claim 25 wherein said copolymer is at least one selected from the group consisting of ABS (acrylonitrile-butadiene-styrene) resin, SAN (styrene-acrylonitrile) resin and NBR (acrylonitrile-butadiene) rubber.

29. The method for producing a water-immersed electrical switch according to claim 25 wherein said copolymer further contains an inorganic pigment.

30. The method for producing a water-immersed electrical switch according to claim 29 wherein said inorganic pigment is carbon black or titanium oxide.

31. The method for producing a water-immersed electrical switch according to claim 29 wherein said inorganic pigment is contained in an amount of 0.01 to 5 wt % based on the weight of the copolymer (dry weight).

32. The method for producing a water-immersed electrical switch according to claim 29 wherein said copolymer is crushed small-sized pieces 3.5 mesh or less in size.

33. The method for producing a water-immersed electrical switch according to claim 25 wherein said acidic group in said modified copolymer has been introduced into the copolymer using at least one inorganic acid selected from the group consisting of concentrated sulfuric acid, sulfuric anhydride, fuming sulfuric acid, chlorosulfonic acid, phosphoric acid, phosphorus chloride and phosphorus oxide.

34. The method for producing a water-immersed electrical switch according to claim 25 wherein said acidic group in said modified copolymer has been introduced into the copolymer using concentrated sulfuric acid with the concentration not lower than 70 wt %.

35. The method for producing a water-immersed electrical switch according to claim 25 wherein said acidic group in said modified copolymer has been introduced into the copolymer by sequentially adding concentrated sulfuric acid or chlorosulfonic acid and sulfuric anhydride or fuming sulfuric acid.

36. A method for producing a water-immersed electrical switch comprising combining a modified copolymer; and a plurality of electrically conductive electrodes;

said modified copolymer being a used resin into which acidic groups are introduced;

said used resin being a modified copolymer containing acrylonitrile and at least one of styrene or a conjugated diene, as constituent units, and acidic groups introduced into said modified copolymer, said used resin having been molded for use in specified application.

37. The method for producing a water-immersed electrical switch according to claim 36 wherein said copolymer contains 5 to 80 mol % of acrylonitrile units.

38. The method for producing a water-immersed electrical switch according to claim 36 wherein said copolymer contains 20 to 95 mol % of the constituent unit of at least one of the styrene or a conjugated diene.

39. The method for producing a water-immersed electrical switch according to claim 36 wherein said copolymer is at least one selected from the group consisting of ABS (acrylonitrile-butadiene-styrene) resin, SAN (styrene-acrylonitrile) resin and NBR (acrylonitrile-butadiene) rubber.

40. The method for producing a water-immersed electrical switch according to claim 36 wherein said copolymer further contains an inorganic pigment.

41. The method for producing a water-immersed electrical switch according to claim 40 wherein said inorganic pigment is carbon black or titanium oxide.

42. The method for producing a water-immersed electrical switch according to claim 40 wherein said inorganic pigment is contained in an amount of 0.01 to 5 wt % based on the weight of the copolymer (dry weight).

43. The method for producing a water-immersed electrical switch according to claim 36 wherein said acidic group in said modified copolymer has been introduced into the copolymer using at least one inorganic acid selected from the group consisting of concentrated sulfuric acid, sulfuric anhydride, fuming sulfuric acid, chlorosulfonic acid, phosphoric acid, phosphorus chloride and phosphorus oxide.

44. The method for producing a water-immersed electrical switch according to claim 36 wherein said acidic group in said modified copolymer has been introduced into the copolymer using concentrated sulfuric acid with the concentration not lower than 70 wt %.

45. The method for producing a water-immersed electrical switch according to claim 36 wherein said acidic group in said modified copolymer has been introduced into the copolymer by sequentially adding concentrated sulfuric acid or chlorosulfonic acid and sulfuric anhydride or fuming sulfuric acid.

46. The method for producing a water-immersed electrical switch according to claim 36 wherein said copolymer is crushed small-sized pieces 3.5 mesh or less in size.

* * * * *